(12) United States Patent
Ott et al.

(10) Patent No.: US 6,671,395 B1
(45) Date of Patent: Dec. 30, 2003

(54) DOCUMENT IMAGE PROCESSING WITH STROKE PRESERVATION AND BACKGROUND SUPPRESSION

(76) Inventors: D. Michael Ott, 777 Panoramic Way, Berkeley, CA (US) 94704; Frederick J. Crowhurst, 4278 Knoll Ave., Oakland, CA (US) 94619; Stephen J. Williams, 2020 Tampa Ave., Oakland, CA (US) 94611

(*) Notice: Subject to any disclaimer, the term of this patent is extended or adjusted under 35 U.S.C. 154(b) by 0 days.

(21) Appl. No.: 09/418,470

(22) Filed: Oct. 15, 1999

(51) Int. Cl.$^7$ .................................................. G06K 9/00
(52) U.S. Cl. ...................... 382/137; 382/176; 382/199; 382/258; 358/465
(58) Field of Search .................................. 382/137, 256, 382/257, 258, 176, 119, 199, 200, 202; 358/465, 464

(56) References Cited

U.S. PATENT DOCUMENTS

| | | | | |
|---|---|---|---|---|
| 4,520,505 A | * | 5/1985 | Yamamoto et al. | 382/258 |
| 4,675,909 A | * | 6/1987 | Egami et al. | 382/172 |
| 4,853,970 A | * | 8/1989 | Ott et al. | 382/266 |
| 5,524,070 A | * | 6/1996 | Shin et al. | 382/263 |
| 5,600,732 A | | 2/1997 | Ott et al. | 382/112 |
| 5,748,794 A | * | 5/1998 | Maeda et al. | 382/251 |
| 5,859,929 A | * | 1/1999 | Zhou et al. | 382/175 |
| 5,905,579 A | * | 5/1999 | Katayama et al. | 358/296 |
| 5,974,191 A | * | 10/1999 | Harada et al. | 382/258 |
| 6,072,907 A | * | 6/2000 | Taylor et al. | 358/1.9 |
| 6,227,725 B1 | * | 5/2001 | Ancin et al. | 358/1.11 |
| 6,240,215 B1 | * | 5/2001 | Salgado et al. | 358/1.13 |

OTHER PUBLICATIONS

S. Djeziri, et al., "Extraction of Signatures from Check Background Based on Filiformity Criterion," IEEE Transactions on Image Processing, vol. 7, No. 10, Oct. 1998, pp. 1425–1438.

* cited by examiner

Primary Examiner—Amelia M. Au
Assistant Examiner—Anand Bhatnagar
(74) Attorney, Agent, or Firm—Elliot B. Aronson

(57) ABSTRACT

A method for improved readability of digitally captured document images that include printed or handwritten textual material overlaid on background graphics. Text in the document is generally composed at least in part of strokes characterized by pairs of edges in close proximity to one another. The digital image comprises an array of pixels representing at least a portion of the document. The edges in the pixel array are first identified and then grown by an effective amount so as to cause pairs of edges characterizing each stroke substantially to merge. The grown edges are then shrunk by an effective amount so as to cause non-stroke edges to be substantially eliminated without eliminating the merged stroke edges. A binarized representation of the merged stroke edges is then provided using an algorithm that is adapted to give a good representation of edge images, and a binarized representation of non-stroke regions of the pixel array is provided using a different algorithm especially adapted to represent the non-stroke regions. A document image with reconstructed textual matter may also be combined with a representation of the background graphics in which the overall contrast of the background graphics has been reduced. This may be achieved, for example, by scaling back the contrast of the captured digital image by a fixed percentage or by a variable amount prescribed by a formula, and then subjecting the scaled-back image data to a process such as a digital half-tone process providing a good binarized representation of the reduced-contrast image.

10 Claims, 2 Drawing Sheets

DOCUMENT IMAGE PROCESSING WITH STROKE PRESERVATION AND BACKGROUND SUPPRESSION

BACKGROUND OF THE INVENTION

The invention relates generally to the electronic processing of images and is more particularly directed to the processing of document images that may include handwritten or printed text overlying background graphics, such as is commonly present in bank checks presented for payment.

In many document-processing applications the images of the documents to be processed are electronically captured and presented to operators at workstations for data entry or other processing, such as optical character recognition, directly from the electronic images. The images may be archived on magnetic or optical media and subsequently retrieved and displayed or printed when needed. This is the case for example with bank checks presented for payment. Checks are processed in high volumes by capturing the images of the front and back sides of the checks on high-speed document transports. The images are then displayed at workstations where-operators may enter the dollar amounts, verify signatures, reconcile inconsistencies and undertake other processing steps. Many financial institutions will then provide their account holders printouts showing small-scale black and white printed images of recently processed checks with the monthly account statements.

A problem arises in working with such digital images of checks or other documents. Bank checks frequently include background pictures printed on the checks for decorative purposes or background patterns printed for security purposes. The various data fields to be filled in with substantive information, such as payee, date, dollar amount, and authorizing signature of the payor, generally overlie the background. In the digitally captured image of such checks the substantive data fields are sometimes difficult to read because of interference from the digitally captured background image or pattern. Printouts of such check images may be even harder to read because of their reduced size.

Early systems for image processing of bank checks tried to eliminate the background picture or pattern altogether from the captured image of the check. Such early systems typically employed a thresholding technique to eliminate the background. Such techniques have not been entirely successful. They tend to leave behind residual black marks left over from the background image that interfere with the substantive information on the check and in some instances may even degrade the handwritten or printed textual matter on the check making it more difficult to read. In addition, it is sometimes desirable to retain some or all of the background picture, for example, to print images of the checks along with a bank statement. The problem here is that an insensitive threshold may avoid most, although generally not all, of the background but may miss some of the low-contrast text, whereas a more sensitive threshold may pick up most of the low-contrast text but more of the background, too.

Over the years various other approaches have been developed for handling background graphics in document images and either eliminating the background or reproducing it in a more readable fashion. Such other approaches may be seen for example in U.S. Pat. Nos. 4,853,970 and 5,600,732. See also the recent publication by S. Djeziri et al., entitled "Extraction of Signatures from Check Background Based on a Filiformity Criterion," IEEE Transactions on Image Processing, Vol. 7, No. 10, October 1998, pp. 1425–1438, and references cited therein for general discussions of the field.

In particular, U.S. Pat. No. 4,853,970 discloses an approach in which the captured image of a document is first analyzed to find the edges of pictorial or text features present in the image. The edges separate other areas of light and dark over which the intensity varies more gradually, if at all. The image is then reconstructed by separately reconstructing the edges with an algorithm, referred to in U.S. Pat. No. 4,853,970 as a point algorithm or point operator, that is adapted to give good representation of the image where edges are located and reconstructing the expanses of gradual intensity variation with an algorithm, referred to in U.S. Pat. No. 4,853,970 as a level algorithm or level operator, that is appropriate for such gradual variations. For example, a thresholding algorithm with very insensitive threshold could be used for the second algorithm if it is desired to minimize the background or a digital half-toning algorithm could be used to give a good representation of pictorial graphics without compromising the textual matter, which is composed primarily of characters that have strong edges.

Notwithstanding the benefits of this method, it nevertheless represents a compromise in the clarity and readability of the original document.

SUMMARY OF THE INVENTION

The present invention provides a method for improved readability of digitally captured document images that include textual material (printed or handwritten) and background graphics. The method is especially suited for image processing of bank checks, remittance documents or other such financial documents that tend to have textual characters overlaid on a wide variety of decorative pictures or security patterns.

The method takes advantage of the fact that handwritten or printed characters are generally composed of comparatively thin features referred to as strokes, in which two more or less parallel edges are in close proximity to one another. An improved representation of such textual handwriting and printing is provided by first determining those pixels in the captured image that are part of a stroke. Pixels in the neighborhood of a stroke edge are assigned a black or white value according to a so-called point algorithm adapted to give a good representation of edges. Pixels not in the neighborhood of a stroke are assigned a black or white value according to a level algorithm, that is, according to an algorithm adapted to give a good representation of slowly varying or constant intensities. The level algorithm is used to assign pixel values even for pixels in the neighborhood of an isolated edge, that is, a non-stroke edge, forming a part of a background graphic. In this way, stroke images are preserved while isolated edges in the background are de-emphasized. The background graphic itself may be substantially eliminated if desired by, for example, applying a level thresholding algorithm with an insensitive threshold. The strokes making up the printed or handwritten text will be preserved because they are not subjected to the level algorithm, and the edges of shaded areas forming a part of the background graphic will not be singled out for special treatment and will generally be eliminated by the level algorithm. Of course, where the background graphic is itself in the form of line art composed primarily of strokes, the background graphic will not be eliminated by the level algorithm, but on the contrary the strokes of the line art will be preserved the same as the strokes of any overlaid textual matter. Even here, however, the method can lead to improved readability because preserving the individual strokes comprising the line art in turn preserves the integrity of the line art as a whole. The reader is then better able to differentiate the underlying line art from the textual matter by the substantive context of the line art.

To determine those edges that are paired edges forming part of a stroke, an edge operator is applied to construct an idealized edge in each neighborhood of rapid intensity variation. Each side of a stroke that is part of a textual character will generate its own edge image so that an edge operator applied to the pixels in the vicinity of a stroke will generate two closely spaced lines with only a thin area between them. Then a grow operation is applied to all edge images constructed by the edge operator so as to enlarge the edges into fatter, intermediate lines. For edge images deriving from the two neighboring edges of a stroke, the two intermediate lines so generated will generally merge with one another forming one fat line. Then a shrink operation is applied to the intermediate lines resulting from the grow operation. The shrink operation is of an effective magnitude that an isolated edge will not survive the shrink operation and will disappear whereas a fat intermediate line resulting from a stroke will remain, although it may now be reduced to a thin line. Then a grow operation is applied to bring the preserved intermediate line originated by the stroke back to a width approximating its original width. At this stage the edges that remain are to a great extent only those that derive from strokes. These edge pixels are then used to select either a point algorithm or level algorithm for binarizing the image data.

In some cases it is desirable not to completely suppress the background graphics, but rather to include the background graphics in the image of the document that is to be preserved. Here it has been found advantageous to add back into the document image a representation of the background graphics in which the overall contrast of the background graphics has been reduced. This may be achieved, for example, by scaling back the contrast of the captured digital image by a fixed percentage or by a variable amount prescribed by a formula, and then subjecting the scaled-back image data to a process such as a digital half-tone process providing a good binarized representation of the reduced-contrast image. This binarized representation is then mixed with the stroke-preserved image described above. The benefit of intermixing a reduced-contrast image with an image separately processed to enhance textual matter is not limited to the stroke-preservation method referenced above. An improvement in image quality and overall document readability may also be realized when other methods are used to reconstruct the textual matter.

Other aspects, advantages, and novel features of the invention are described below or will be readily apparent to those skilled in the art from the following specifications and drawings of illustrative embodiments.

DETAILED DESCRIPTION OF ILLUSTRATIVE EMBODIMENTS

Figure 1:
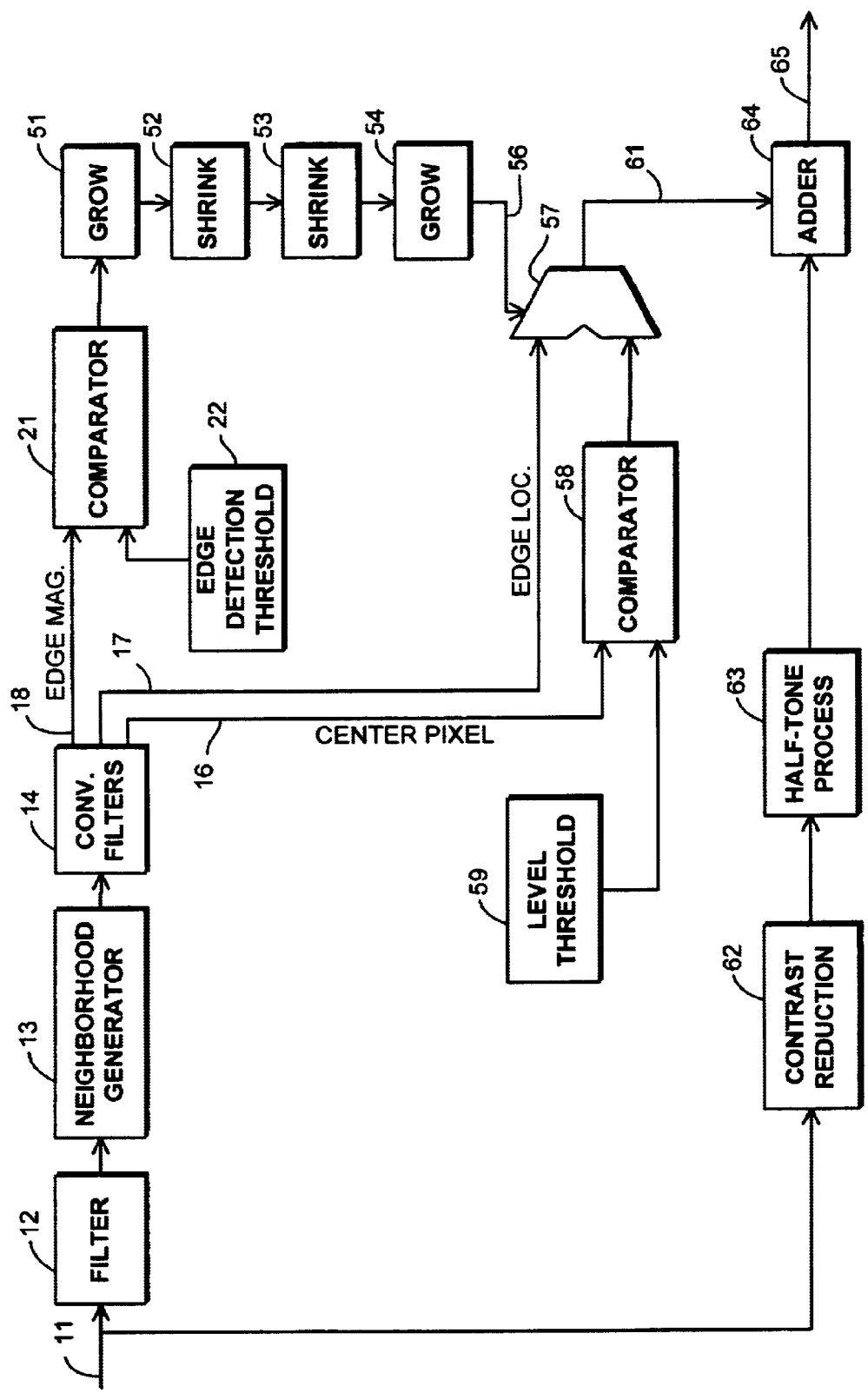
FIG. 1 is a block diagram of apparatus for practicing the invention.

The invention will be described in an embodiment for use in processing bank checks. It will be readily apparent however that the image processing method illustrated here may be used with other types of documents as well and no limitation to checks is thus intended. FIG. 1 shows an example of apparatus for processing check images. First the image of a check is captured by well known means that need not be described here, and a digital image data stream representative of the captured image is presented to the apparatus along line 11. The digital image data stream is composed of a stream of pixel data, in which the brightness of each pixel is represented digitally by a number, such as an 8-bit number with the value 0 representing a fully black pixel and the value 255 representing a fully white pixel. The image data stream may be subjected to optional preliminary filtering represented by filter 12. The image data stream is then presented to a neighborhood generator 13, which serves to define a neighborhood of pixels about each pixel in the image data stream. The generation of pixel neighborhoods for image processing purposes is well known and need not be described in detail here. A configuration of apparatus for this purpose is disclosed in more detail, for example, in U.S. Pat. No. 4,853,970. Briefly, the raw video data is captured in a sequence of scan lines where individual scan lines extend across the document and successive scan lines in the sequence are positioned at successive vertical heights along the document. (This assumes a linear scanner is used although area scanners may also be used to generate the image data stream.) For any given pixel in the image data stream the neighborhood generator presents an array of pixels to the subsequent processing circuitry that typically constitutes a square neighborhood of the given pixel. The given pixel about which the neighborhood is generated is referred to generally as the center pixel, although in some circumstances it may not in fact be symmetrically disposed in the center of the neighborhood, for example, at the perimeter of the scanned image. In the illustrated embodiment the neighborhood generator accomplishes its function by subjecting successive scan lines about the center pixel to appropriate delays so that the pixels forming a desired array about the center pixel may be presented simultaneously. The neighborhood may be of selectable size, typically chosen to be 3×3, 5×5, 7×7 or 9×9, depending on the blur characteristics of the image to be processed. For the purposes of the present invention the manner in which the neighborhood is generated is not important so long as a center pixel and sparse or dense neighborhood of appropriate size for the minimum feature size and blur characteristics of the particular image are made available for subsequent processing.

Neighborhood generator 13 presents each pixel along with its neighborhood to the subsequent convolution filter block 14, which provides three outputs. One output is the center pixel along line 16. A second output is referred to here as the edge location bit and is provided along line 17. The third output is referred to here as the edge magnitude and is provided along line 18.

The edge magnitude provides a measure of the variation of intensity values across the neighborhood. It is in essence a measure of the strength of the transition between light and dark in the neighborhood of the center pixel. If the edge measure is large, then it is assumed that the center pixel is by an edge because within the neighborhood the intensity is changing rapidly between light and dark, and such change is characteristic of an edge. The edge magnitude may be defined, for example, as the average of the difference in intensity values between the center pixel and all the pixels of the neighborhood. The specific formula for the edge magnitude is not critical to the operation of the invention. For the invention to give meaningful results it is only necessary that the edge magnitude generally reflect whether the center pixel is by an edge or not. Thus other configurations and other algorithms for generating an edge magnitude may be used in practicing the present invention.

The edge magnitude data stream on line 18 is applied to comparator 21, which compares the edge magnitude with an edge-magnitude threshold value provided by edge detection threshold 22. The edge detection threshold may be either fixed or adaptive. One simple adaptive algorithm for generating the edge detection threshold is to use a multiple (e.g. 4 times) the average edge magnitude of the image. The output of comparator 21 provides logical "1" only for those center pixels with an edge magnitude exceeding the threshold, that is to say, for those center pixels that the comparator determines are by an edge. The logical "1" is viewed as a black pixel and the black pixels so generated are subjected to a grow operation as described below.

According to the method of U.S. Pat. No. 4,853,970, for those center pixels by an edge, an algorithm adapted for good representation of the image where edges are located is applied to determine whether the pixel should be considered on the light or dark side of the edge and a black or white pixel value is assigned accordingly. For those center pixels determined not to be by an edge, that is, for pixels in the interior of a shaded region, an algorithm is applied that is more suitable for constant or gradually varying pixel values. The problem with this approach is that edges are treated the same whether they are part of a text character or part of a picture feature such as the edge of a shaded area. The present invention differentiates between these two types of edges as will now be described with reference to FIGS. 2 and 3. The thicknesses of the lines appearing in FIGS. 2A–2F and 3A–3F have been exaggerated for purposes of illustration.

Figure 2A:
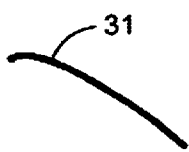
FIGS. 2A–2F show a sequence of lines generated in the processing of a stroke in accordance with the invention.
Figure 2B:
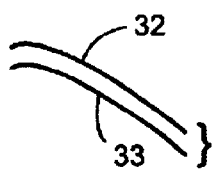
Figure 2C:
Figure 2D:
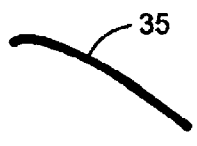
Figure 2E:
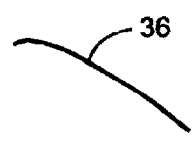
Figure 2F:
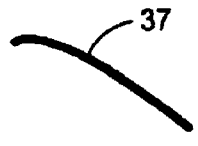

FIG. 2A shows a representative stroke 31. The edge measure applied to pixels across stroke 31 will detect both an upper edge 32 and lower edge 33 with a small separation between them representing the "interior" region of the stroke as illustrated in FIG. 2B. The separation between stroke edges 32 and 33 has been exaggerated for purposes of illustration. FIG. 2B represents the output of edge measure comparator 21 for pixels comprising stroke 31. The pixels of FIG. 2B are then subjected to a grow operation. A "grow operation" as usually encountered in image processing applications is the process of adding one or more black pixels to the neighborhood of a given black pixel to "fatten up" the image of the given black pixel. The result of subjecting the pixels of a line to a grow operation is a fatter line. When the two closely spaced lines 32 and 33 of FIG. 2B are both subjected to a suitable grow operation, the resulting fatter lines will overlap and merge into one fat intermediate line 34 shown in FIG. 2C. Now the intermediate line 34 of FIG. 2C is subjected to two successive shrink operations. A "shrink operation" as usually encountered in image processing applications is the inverse to a grow operation. One or more white pixels are added to the neighborhood of a given white pixel to "thin out" the black image of the neighborhood. FIGS. 2D and 2E show the lines 35 and 36 resulting from the two shrink operations. Finally the line 36 is subjected to a grow operation to thicken it up to approximate its original size as illustrated by line 37 in FIG. 2F.

Figure 3A:
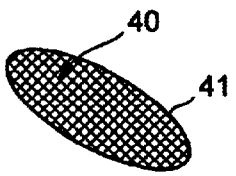
FIGS. 3A–3F show a sequence of lines generated in the processing of an isolated edge in accordance with the invention.
Figure 3B:
Figure 3C:
Figure 3D:
Figure 3E:
Figure 3F:
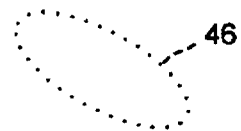

The reason for subjecting the images of strokes to these operations will be appreciated by following the same sequence applied to an isolated edge as shown in FIGS. 3A–3F. The area 40 indicated by the cross-hatched region in FIG. 3A represents a shaded area in a background picture. The area 40 is bounded by an isolated edge 41. When subjected to the edge-measure thresholding, the area 40 and bounding edge 41 produce only a single line 42 at the output of edge-measure comparator 21. In FIG. 3C line 42 has been grown to produce line 43. Since line 42 was generated by isolated edge 41 and not by a (double-edged) stroke, FIG. 3C does not show the merger of two lines as in FIG. 2C and the resulting line 43 is proportionately thinner. The first shrink operation then produces a yet thinner line 44 seen in FIG. 3D. Under the action of a second shrink operation the line 44 disappears altogether as illustrated by the line 45 in phantom in FIG. 3E. The final grow operation will not produce any results since there are no longer any black pixels to grow as illustrated by the line 46 in phantom in FIG. 3F.

It may now be seen that the sequence of grows and shrinks applied to the output of edge-measure comparator 21 distinguishes the strokes from the isolated edges. The isolated edges do not survive the sequence of operations.

Returning now to FIG. 1, the sequence of grow and shrink operations is represented by the blocks 51–54 following comparator 21. The output of the final grow operation 54 is then applied to the select line 56 of multiplexer 57. Multiplexer 57 receives the edge location bit stream on line 17 at a first of its inputs and a level bit stream at a second of its inputs. The edge location bit stream is so called because it gives the nominal location of the edge. It is generated by a so-called point algorithm that is formulated to give a clear representation of edges. The edge location bit determines on which side of the edge the associated pixel lies. For example, the point algorithm may examine the intensity gradient across the neighborhood of the center pixel and, based on a prescribed threshold value associated with a virtual boundary, assign a black or white pixel to the center pixel depending on which side of the virtual boundary, that is, on which side of the prescribed threshold, the center pixel lies. This example is offered only by way of illustration. The invention may be practiced with a variety of point algorithms provided only that they give a good representation of the image where edges are located.

The level bit stream is generated by a so-called level operator. In the block diagram of FIG. 1 the level operator is provided by level comparator 58 and level threshold 59. The level threshold may be either fixed or adaptive. One simple adaptive algorithm for generating the level threshold is to use a percentage (e.g. 50%) of the average brightness of the image. Comparator 58 receives the center pixel on line 16 at a first input and receives a threshold value from level threshold 59 at a second input. The level threshold will generally be set at an insensitive level to eliminate the background.

In operation, either the edge location bit stream on line 17 or the level bit stream from comparator 58 is passed through multiplexer 57 depending on the state of select line 56. Since select line 56 is controlled by the results of the sequence of grow and shrink operations, and now carries only strokes, multiplexer 57 will pass the edge location bit value only for those pixels that select line 56 shows to be part of a stroke. For all other pixels, that is, for all pixels not part of a stroke, multiplexer 57 passes the level bit stream. Line 61 at the output of multiplexer 57 now carries a binarized representation of the original captured image that preserves and emphasizes the stroke features and de-emphasizes or, if the level threshold is set sufficiently insensitive, eliminates the (non-stroke) background. The images of bank checks generated by this method are generally found to exhibit improved readability over other methods of generating check images.

The implementation of apparatus to carry out the above-described method is well within the ordinary skill of those in the image processing field. U.S. Pat. No. 4,853,970, for example, discloses a more detailed implementation for neighborhood generation, the edge-magnitude thresholding technique, a point operator by which an edge location bit is generated, and a level operator for treating background graphics. Alternatively, these functions may be carried out by processing the digitized image data with a suitable commercially available integrated circuit processing chip, such as a model VST-1000 thresholder chip from Picture Elements Incorporated of Berkeley, Calif. This processing chip is adapted to assign values of black and white to each pixel of the image data stream by distinguishing edges from non-edge areas. Alternatively, a more general purpose processor can be programmed to perform these functions.

Implementation of the grow and shrink operations is entirely routine and need not be described in detail here. Although FIG. 1 shows two successive grow operations at blocks 52 and 53, that division into two steps is not necessary to achieve the benefits of the invention. In practice the grow operation of block 51 need only grow the black pixels by an effective amount sufficient to cause the pairs of edges characterizing each said stroke substantially to merge, and the shrink operations of blocks 52 and 53 need only shrink the grown edges an effective amount sufficient to cause non-stroke edges to be substantially eliminated without eliminating the merged stroke edges. The magnitude that constitutes an effective amount of the grows and shrinks depends on such characteristics as blur and feature size of the original document and on the particular apparatus for capturing the image of the document. Thus, the effective amount is best determined empirically for a given configuration of apparatus and for typical documents to be imaged.

As described thus far, line 61 carries a highly readable representative image in which the strokes are preserved and the background may be suppressed. In the image processing of bank checks for data entry and other functions, it is generally considered desirable to suppress the background altogether so that the background does not interfere with the legibility of the substantive content of the check. In some cases however it is desirable also to show the background, for example, when printing images of checks to accompany a bank statement. It has been found that an improved background image may be obtained without sacrificing the readability of the document by carrying out the above-described stroke preservation method and then adding back into the image data a representation of the document image in which the overall contrast has been reduced.

In FIG. 1 the initial image data stream is applied to block 62, which reduces the contrast compared to the white level of the document. This may be accomplished, for example, simply by scaling back the values of the pixel contrast by a fixed amount. A constant scaling factor of fifty percent of the initial contrast value has been found effective to produce readable images of the background without reducing the legibility of the substantive content of the check. For example, to reduce the contrast by fifty percent, the original brightness range of 0 (black) to 255 (white) is mapped to a range of 128 (gray) to 255 (fully white). The reduced-contrast image data is then subjected to an appropriate algorithm at block 63 such as a digital half-tone algorithm for producing a black and white representation of the background graphics. The reduced-contrast binarized image is then combined with the stroke-preserved image on line 61 at adder 64. The adder 64 can be a simple "OR" gate, if the pixels to be added to the image are represented by a "0" bit for white and a "1" bit for black. In this case, if both the stroke-preserved and the half-toned pixels are white, the resulting pixel is white, but if either the stroke preserved pixel is black (e.g. a stroke in the image) or the half-toned pixel is black (e.g. a background feature is present) then the resulting pixel is black. This produces a highly readable reconstructed image on line 65 in which the strokes have been preserved so that the handwritten and printed text are highly readable and in which the background graphics has only been partially suppressed to a level at which it does not interfere with the text, yet integrity of the graphic has been maintained so that the graphic is plainly recognizable. It has been found that the textual material in such an image is sometimes even more readable because not only are the stroke images well represented but also the reader is able to separate out the background by the context of the graphic. A feature that might otherwise appear as a smudge or extraneous line associated with a text line now becomes recognizable as part of a graphic image.

In its broadest aspects the invention is not intended to be limited to the constant scale reduction or digital half-toning offered as examples above. Other, non-linear scaling operations and other continuous tone rendering operations may also be used within the scope of the invention. For example, if the image is to be displayed on a display device that has the ability to display continuous tone images, then the half-toning step becomes unnecessary and adder 64 may implement a simple masking operation where the black pixels in the stroke-preserved image force the corresponding pixels from the background image to black.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, when the above method is applied to an image in reverse video, "black" and "white" in the above explanations are understood to mean "white" and "black," respectively. Therefore, the invention is not to be limited to the above description and illustrations, but is defined by the appended claims

What is claimed is:

1. A method of processing a digital image of a document, said document including text composed at least in part of strokes characterized by pairs of edges in close proximity to one another, said text overlying a background graphic including non-stroke edges, the digital image comprising an array of pixels representing at least a portion of said document, comprising the steps of:

identifying said edges in said pixel array;

growing each said edge an effective amount so as to cause said pairs of edges characterizing each said stroke substantially to merge;

shrinking the grown edges an effective amount so as to cause non-stroke edges to be substantially eliminated without eliminating said merged stroke edges;

providing a representation of said merged stroke edges according to a first algorithm adapted for representation of edge images;

providing a representation of non-stroke regions of said pixel array according to a second algorithm adapted to represent said non-stroke regions.

2. The method of claim 1 wherein said second algorithm is a thresholding algorithm.

3. The method of claim 2 wherein said thresholding algorithm includes an insensitive threshold set to substantially eliminate non-stroke portions of said background graphic.

4. The method of claim 1 wherein said representation of said merged stroke edges is a binarized representation.

5. The method of claim 1 wherein said representations of said merged stroke edges and of said non-stroke regions of said pixel array are binarized representations.

6. The method of claim 1 further comprising the, step of growing the shrunken merged stroke edges prior to providing said representation thereof.

7. The method of claim 1 further comprising the steps of:

reducing contrast levels of said pixel array to provide a reduced contrast pixel array;

providing a representation of said reduced contrast pixel array according to an algorithm adapted for representation of gray scale images; and combining said representation of said reduced contrast pixel array with said representations of said merged stroke edges and said non-stroke regions whereby a reconstructed image is provided including preserved stroke images and reduced contrast background graphic.

8. A method of processing a digital image of a document, said document including text overlying a background graphic, the digital image comprising an array of pixels representing at least a portion of said document, comprising the steps of:

processing said pixel array to enhance said text and to suppress said background graphic and providing a representation thereof;

reducing contrast levels of said pixel array to provide a reduced contrast pixel array;

providing a representation of said reduced contrast pixel array according to a first algorithm adapted for representation of gray scale images; and combining said representations of said reduced contrast pixel array and said enhanced text with suppressed background whereby a reconstructed image is provided including enhanced text and reduced contrast background graphic.

9. The method of claim 8 wherein at least said text includes a plurality of edges and said processing step further comprises:

identifying said edges in said pixel array;

providing a representation of said edges according to a second algorithm adapted for representation of edge images; and thresholding said background graphic at an insensitive threshold level set to substantially suppress said background graphic.

10. The method of claim 9 wherein said representation of said edges is a binarized representation.

* * * * *